INVENTOR
JAMES J. FLANAGAN
BY
*R. J. Dearborn*
ATTORNEY

Aug. 8, 1944.  J. J. FLANAGAN  2,355,213
PORTABLE CONVEYER
Filed June 20, 1942  7 Sheets-Sheet 5

INVENTOR
JAMES J. FLANAGAN
BY
R. J. Dearborn
ATTORNEY

Aug. 8, 1944.     J. J. FLANAGAN     2,355,213
PORTABLE CONVEYER
Filed June 20, 1942      7 Sheets-Sheet 6

INVENTOR
JAMES J. FLANAGAN
BY
ATTORNEY

Aug. 8, 1944.    J. J. FLANAGAN    2,355,213
PORTABLE CONVEYER
Filed June 20, 1942    7 Sheets-Sheet 7

INVENTOR
JAMES J. FLANAGAN
BY
ATTORNEY

Patented Aug. 8, 1944

2,355,213

UNITED STATES PATENT OFFICE 2,355,213

PORTABLE CONVEYER

James J. Flanagan, Port Arthur, Tex., assignor to The Texas Company, New York, N. Y., a corporation of Delaware Application June 20, 1942, Serial No. 447,789

6 Claims. (Cl. 214—14)

This invention relates to an improved cargo conveying apparatus for facilitating the transfer of units of cargo between a dock and a ship so that loading or unloading of a ship may be accomplished in a rapid and efficient manner with a minimum of manual handling of the cargo.

It is an object of the invention to provide a portable cargo conveying apparatus capable of operating at different levels, as when the relative position between a ship and dock is changed by reason of the rise or fall of the tide, or by reason of changes in the weight of the cargo in the hold of the ship which obviously results in changing the level of the ship's decks with respect to that of the dock.

Another object of the invention is to provide a cargo conveying apparatus which is capable of ready adjustment to compensate for the continuously changing conditions under which it may be necessary to operate the apparatus.

Another object of the invention is to provide a cargo conveying apparatus comprising separate units capable of being easily transported from place to place but adapted to be operatively connected together to function as a unitary structure.

Still another object of the invention is to provide an apparatus of the type mentioned which is capable of conveying in either direction a continuous succession of cargo units.

A still further object of the invention is to provide a cargo conveying apparatus capable of being operated in a substantially continuous manner in order that a minimum of time may be required to load or unload a ship, and in which the individual units of the apparatus are operated in synchronism or timed relation.

The invention has many other objects, features and advantages which will more readily appear from the detailed description which follows, as well as from the accompanying drawings in which.

Generally speaking, the apparatus includes three principal structural units, namely, a vertically disposed dock conveyer unit 10, a vertically disposed ship conveyer unit 12, and a substantially horizontally disposed bridge conveyer unit 14 which is adapted to span the space between a dock 16 and a ship 18. The bridge conveyer unit 14 is operatively connected at its opposite ends to the dock and ship conveyer units 10 and 12, respectively. The dock conveyer unit 10 is mounted upon a wheeled supporting carriage 20 by means of which the entire unit can be readily moved from place to place upon the dock 16 or elsewhere for locating it in the most advantageous operating position. The bridge conveyer unit 14 is pivotally connected at 22 to the dock conveyer unit 10 and means are provided for raising and lowering it to any desired height. The ship conveyer unit is portable and is mounted upon a suitable base 24 which can be readily positioned upon the floor 26 of the hold of a ship, generally being swung into position by a crane or similar hoisting apparatus (not shown). After being placed in position within the hold of a ship, the ship conveyer unit 12 is operatively connected to the bridge conveyer unit 14 in such a manner as to provide a substantially unitary structure, and the conveyers of the dock, bridge, and ship units then operate together and in timed relation.

A brief description of the general construction and arrangement of the three units follows:

Dock conveyer unit

Figures 2, 3, 4:
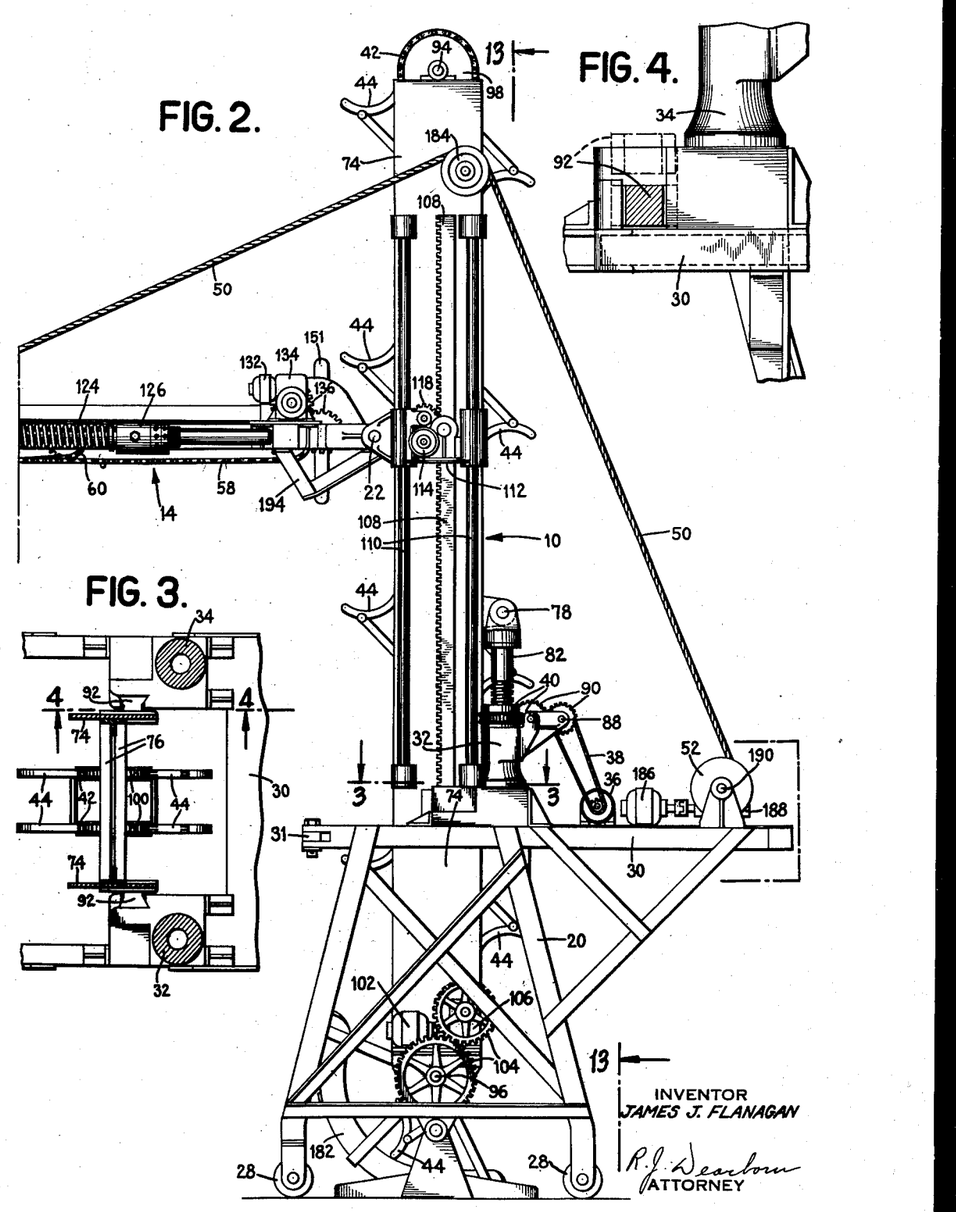
Figure 2 is an enlarged view in side elevation of that portion of the apparatus shown in Figure 1 which normally operates on the dock, herein called the dock conveyer unit.
Figure 3 is a sectional plan view taken on the line 3—3 of Figure 2.
Figure 4 is a view in vertical section taken on the line 4—4 of Figure 3.
Figures 13, 14, 15, 16, 17:
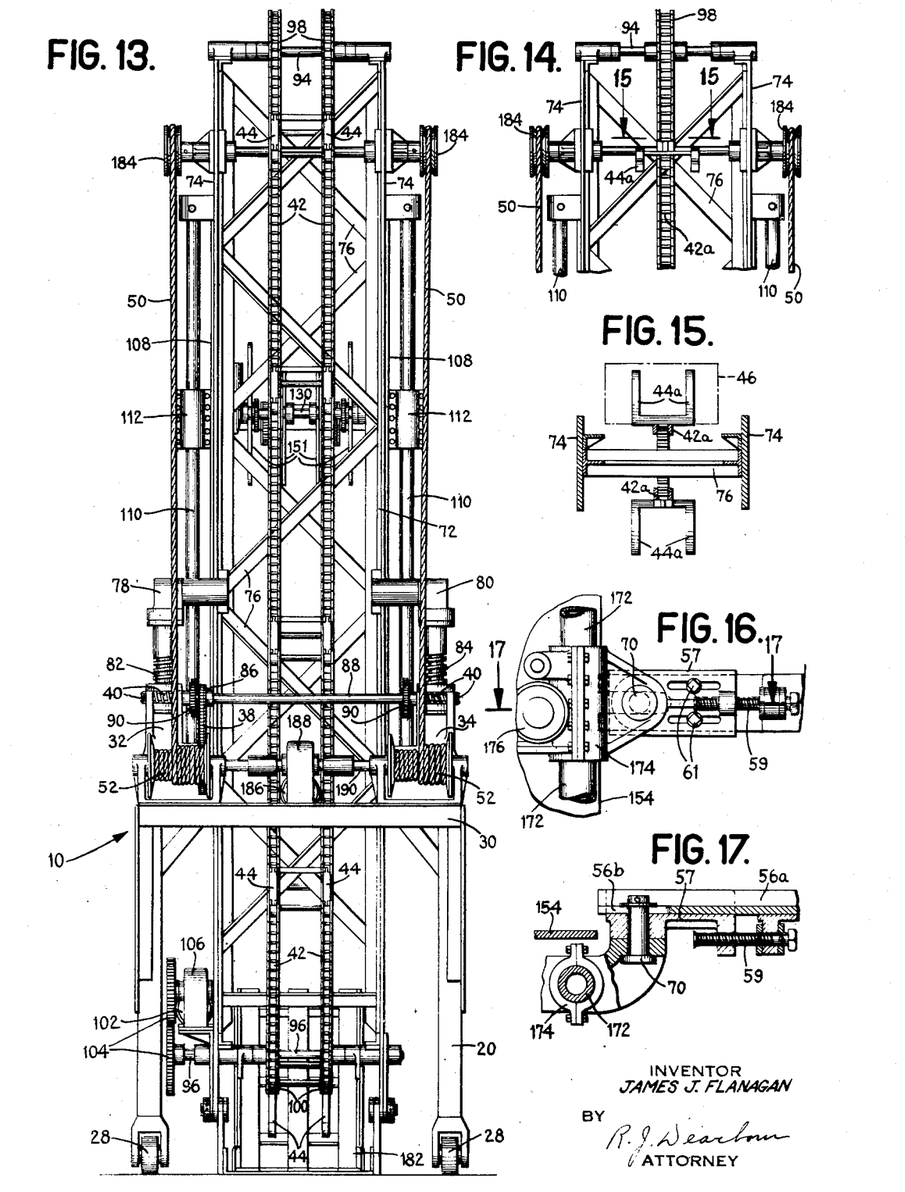
Figure 13 is an enlarged end view of the dock conveyer unit as viewed along section line 13—13 of Figure 2.
Figure 14 is a partial view of a modified form of apparatus in which a single vertical conveyer chain is utilized instead of a double conveyer chain as shown in Figure 13.
Figure 15 is a view in horizontal section taken on the line 15—15 of Figure 14.
Figure 16 is an enlarged detail view of the means used for adjustably connecting the bridge conveyer unit to the ship conveyer unit.
Figure 17 is a detail section taken on line 17—17 of Figure 16.

By reference to Figure 2, it will be seen that the dock conveyer unit 10 is mounted upon a supporting frame or carriage 20 which is provided with wheels 28 to facilitate movement of the unit. The supporting frame is formed to provide a platform 30 for a pair of jacks 32 and 34 upon which the unit 10 is pivotally mounted and by means of which the unit can be raised from or lowered to the dock 16 to permit its movement from one location to another. As viewed in Figures 2 and 9, the platform frame 30 has at its left-hand end a tie bar 31 removably mounted therein to permit shifting of the vertical conveyer 10 to the positions shown in Figures 18 and 20. This tie bar 31 is normally fastened in position as illustrated, when the conveyer is in use, so that the platform 30 is held together as a unitary structure. The jacks 32 and 34 are operated by means of a reversible electric motor 36 through a driving chain 38 and gears 90, 90 hereinafter to be described. The unit is provided with endless conveyer chains 42, 42 which are equipped at spaced intervals with flights or arms 44 for supporting the units of cargo 46 to be moved. A modification of the conveyer chains 42, 42 is illustrated in Figures 14 and 15, wherein a single endless conveyer chain 42a equipped at spaced intervals with flights or arms 44a is utilized for transmitting cargo units 46.

Bridge conveyer unit

As previously stated, the bridge conveyer unit 14 is pivotally connected at one end, as at 22, to the dock conveyer unit 10, and at a point near its opposite end, it is provided with hooks 48, 48 to which cables 50, 50 are attained and by means to which the free end of the unit can be raised or lowered to any desired position, the cables operating upon twin motor-driven windlasses 52, 52 positioned on the platform 30 of the dock conveyer unit 10. The bridge conveyer unit 14 is constructed in two sections 54 and 56 which can be moved longitudinally with respect to each other in order to lengthen or shorten the unit to span varying distances between the dock 16 and the ship 18, and it is provided with two pairs of spaced overlapping endless conveyer chains 58, 78 58 and 60, 60, respectively, these being operated in timed relation with the conveyer chains 42. The chains are equipped at spaced intervals with lugs 62 which engage the units of cargo 46 and propel them in the direction of movement of the conveyer chains 58 and 60.

Ship conveyer unit

Figure 9:
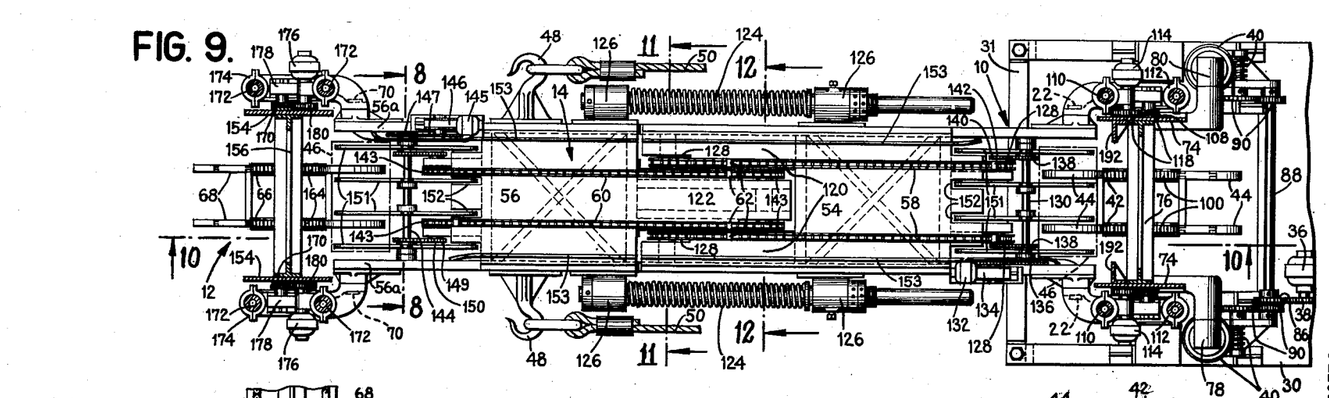
Figure 9 is an enlarged partially sectional plan view of the conveyer section of the apparatus shown in Figure 1.
Figure 10:
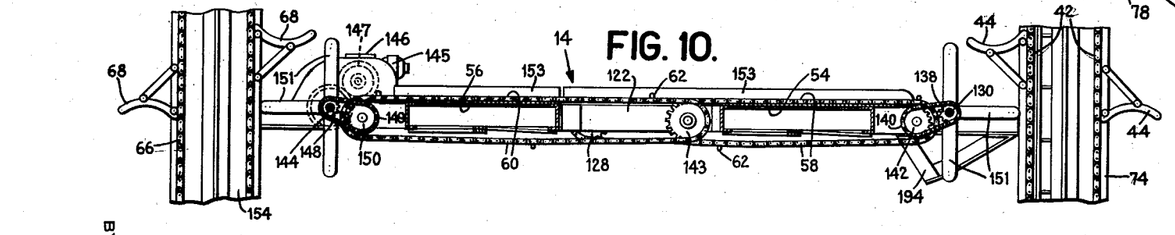
Figure 10 is a view in vertical section taken on line 10—10 of Figure 9.
Figure 11:
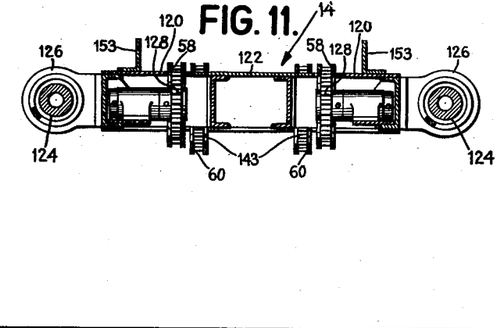
Figures 11 and 12 are enlarged views in vertical section taken on the lines 11—11 and 12—12, respectively, of Figure 9.
Figure 12:
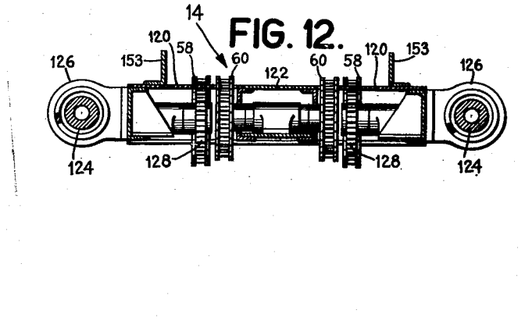

The ship conveyer unit 12 is pivotally mounted upon the base 24 which is adapted to rest firmly upon the floor 26 of the ship's hold or upon any other suitable supporting structure, such as a deck, extending upwardly through one of the ship's hatches 64, and like the other units, it is provided with spaced endless conveyer chains 66, 66 which are equipped at spaced intervals with conveyer flights or arms 68 similar to flights 44 on the dock conveyer chains 42. Means are provided, as shown, at 70 for pivotally connecting this unit 12 with the free end of the bridge conveyer unit 14, and provision is made for vertically moving the attached end of the bridge conveyer unit 14 so that the horizontal position of the latter can be maintained. As shown in Figures 16 and 17 means are provided for facilitating the adjustment necessary in connecting the bridge conveyer 14 to the ship conveyer 12 at the connecting pivot 70. Referring to Figure 9, it will be seen that the section 56 is provided with extensions 56a, 56a which are slotted at 56b, as indicated in Figures 16 and 17, to permit bolt 70 to slide in 56a. A member 57 slidably mounted on the end of 56a can be adjusted to the desired position by means of screw 59 and locked in that position by bolts 61. The endless conveyer chains 66, 66 are operated in timed relation with the conveyers 58 and 60 of the bridge conveyer unit 14 so that the movement of the cargo from the dock to the hold of the ship 18, or from the latter to the dock 16, is maintained continuously and at a constant rate of speed.

Detailed description

Having thus described in a general way the main elements of the three cooperating units and their arrangement, the construction of each unit will now be described in greater detail. Considering first the dock conveyer unit 10, it will be seen by reference to the drawings, and particularly to Figure 13, that it comprises a structural framework, indicated generally by the ordinal 72, having oppositely disposed spaced side plates 74, 74 which are secured in position by a plurality of stays or braces 76. The frame 72 is pivotally connected intermediate its ends, as at 78 and 80, to the threaded spindles 82 and 84 of the jacks 32 and 34, respectively, so that when the spindles 82 and 84 of the jacks are rotated to raise the frame 72 from the dock 16, the frame can be freely swung to any desired position from the vertical, as is clearly shown in Figures 18 and 20.

The jack spindles 82 and 84 are operated, as previously explained, by the electric motor 36 through the driving chain 38 which operates on a sprocket 86 mounted on a horizontally disposed rotatable shaft 88. Also mounted at opposite ends of the shaft 88 are gears 90, 90, and each of these gears operates one of the worm and worm wheel drives 40, 40 through which motion is imparted to the jack spindles 82 and 84.

During loading operations the frame 72 is locked securely in its normal vertical position by means of dove-tail slides 92, 92 which slip out of engagement, as shown in dotted lines in Figure 4, and permit the frame to swing about the pivots 70 and 80.

The frame 72 is provided at its opposite ends with rotatable shafts 94 and 96, both shafts being provided with pairs of spaced sprockets 98 and 100, respectively, which carry the conveyer chains 42. Shaft 96 is driven by means of a reversible electric motor 102 through a train of gears 104 and reducing gears (not shown) in a gear housing 106.

On the outside of each of the side plates 74 of the frame 72 there is secured an elongated stationary rack 108. Likewise, attached to the outside face of each of the side plates 74 are pairs of spaced vertically disposed shafts 110 which are coextensive with the rack 108. Each pair of shafts supports a traveler member 112 which is slidably mounted thereon and which is adapted to travel up and down on the shafts. Vertical movement is imparted to the traveler members by means of reversible electric motors 114, 114, through gear reduction units 116 which operate pinions 118, 118 (Figure 7) which in turn each engage with one of the racks 108. It is to these traveler members 112 that the bridge conveyer unit 14 is pivotally attached at 22, and through the raising and lowering of the traveler members the position of the connected end of the bridge conveyer unit 14 can be changed as desired.

Coming now to the bridge conveyer unit 14, which, as has already been pointed out, is constructed in two cooperating sections 54 and 56. The two sections are normally disposed in a horizontal plane and in longitudinal relationship, and the end of section 54 adjacent to section 56 is bifurcated, as at 120, to receive a central extension 122 formed on the adjacent end of section 56.

The construction and arrangement of the cooperating sections 54 and 56 is such that when secured in cooperative engagement by spring-pressed rods 124, 124 adjustably positioned between bosses 126, 126 which are mounted on opposite sides of each of the sections, they form a substantially unitary structure capable of supporting the two pairs of spaced and overlapping chain conveyers 58, 58 and 60, 60. The section 54 is provided, near each of its ends, with spaced sprocket wheels 128 and these wheels carry the conveyer chains 58. A rotatable shaft 130 is mounted on section 54 at the end thereof adjacent to the dock conveyer unit. This shaft 130 is operated by a reversible electric motor 132 through a gear reduction unit 134 and a gear train 136. Mounted on the opposite ends of shaft 130 are sprocket wheels 138 each of which carries a chain 140 for driving a sprocket 142 which is operatively connected to one of the sprocket wheels 128 on that end of section 54 adjacent to the dock conveyer unit. Similarly, the section 56 is provided near each of its ends with spaced sprocket wheels 143 and these wheels carry the conveyer chains 60. A rotatable shaft 144 is mounted on section 56 at the end thereof adjacent to the ship conveyer unit. This shaft 144 is operated by a reversible electric motor 145 through a gear reduction unit 146 and a gear train 147. Mounted on the opposite ends of shaft 144 are sprocket wheels 148 each of which carries a chain 149 for driving a sprocket wheel 150 which is operatively connected to one of the sprockets 143 on that end of section 56 adjacent to the ship conveyer unit. Each of the rotatable shafts 130 and 144 is provided with a plurality of spaced radially extending arms 151, the individual arms being spaced from one another at angles of approximately 90°. These arms rotate with the shafts upon which they are mounted and are utilized for transferring units of cargo from one unit to another. As they rotate, the arms pass through slots 152 provided in the outer ends of the sections 54 and 56. The bridge conveyer unit 14 is also provided with a pair of oppositely disposed side guides 153, 153 for maintaining the cargo units upon the conveyers while the units are being moved by the conveyer chains 58 and 60.

*Ship conveyer unit*

Figure 1:
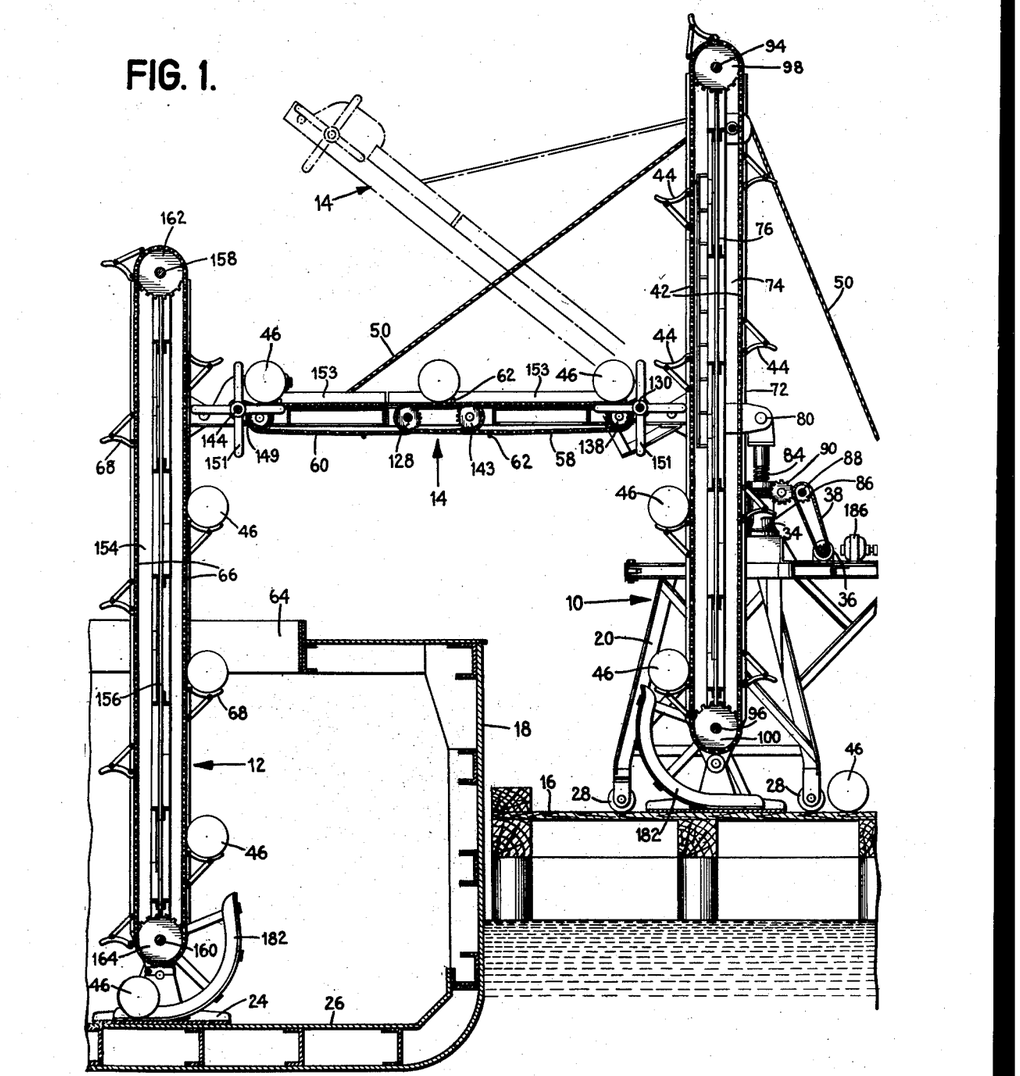
Figure 1 is a partially sectional view of a portion of a ship and of a dock to which the ship is tied up, showing a cargo conveying apparatus embodying the present invention, and in operating position on both ship and dock.
Figures 5, 6, 7, 8:
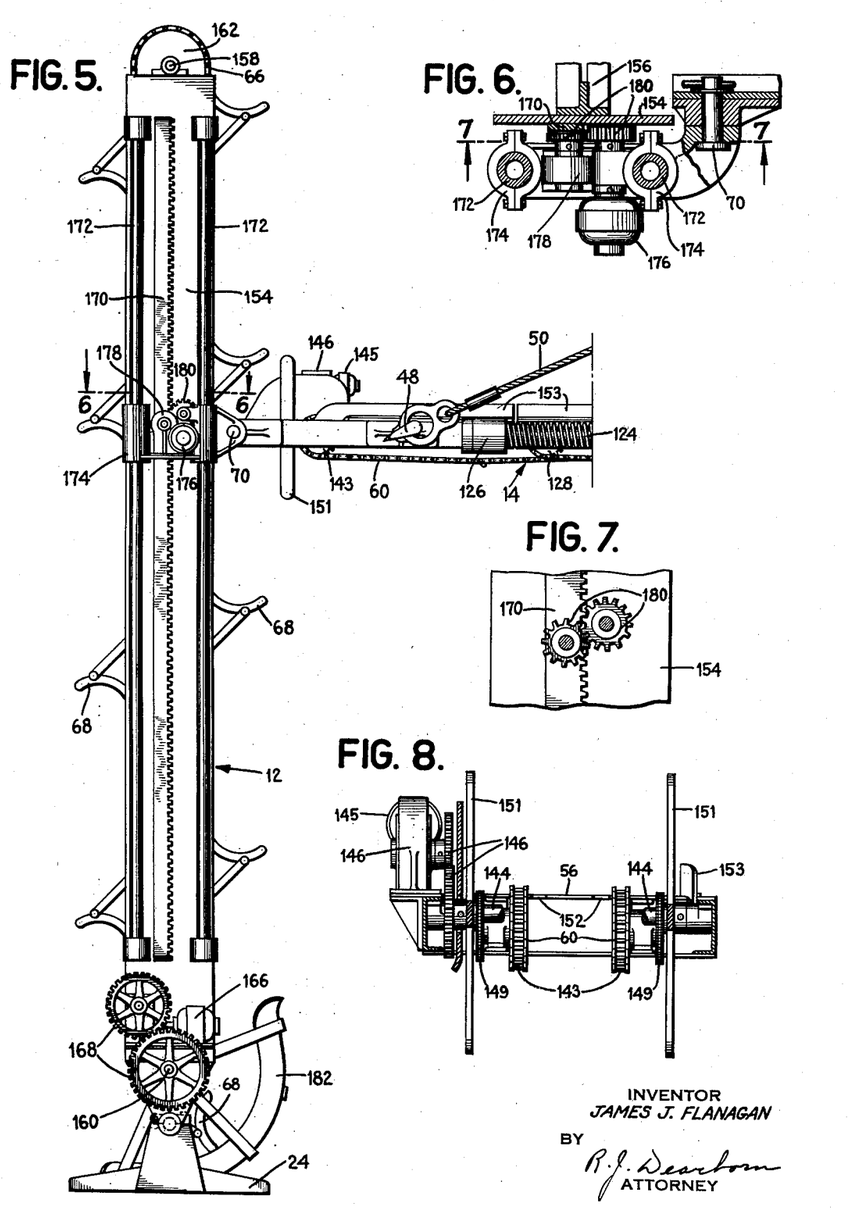
Figure 5 is an enlarged view in side elevation of that portion of the apparatus shown in Figure 1 which normally operates in the hold of a ship, herein called the ship conveyer unit.
Figure 6 is an enlarged sectional plan view taken on the line 6—6 of Figure 5.
Figure 7 is a view in vertical section taken on the line 7—7 of Figure 6.
Figure 8 is an enlarged view in vertical section taken on the line 8—8 of Figure 9.

The ship conveyer unit 12 is in many respects similar to the dock conveyer unit 10 as will be apparent from reference to Figures 1 and 5 from which it will be seen that it comprises a structural framework having spaced side plates 154, 154 which are maintained in position by cross bars 156 (Figure 9). The frame is supported by the base member 24 and is provided at its opposite ends with rotatable shafts 158 and 160. Shaft 158 is provided with a pair of spaced sprockets 162, 162 and shaft 160 is similarly provided with a pair of spaced sprockets 164, 164. These sprockets carry the endless conveyer chains 66, 66 and are driven by means of a reversible electric motor 166 through a train of gears 168.

On the outside of each of the side plates 154, 154 there is secured a stationary rack 170 similar to the racks 108 on side plates 74. Pairs of spaced vertically disposed shafts 172, 172 are attached to the outside faces of each of the side plates 154 and each pair of shafts supports a traveler member 174 which is adapted to travel up and down on the shafts. Movement is imparted to the traveler members 174, 174 by means of reversible electric motors 176, 176 through gear reduction units 178, 178 which operate pinions 180, 180 which in turn each engage with one of the racks 170, 170. The traveler members 174, 174 are pivotally connected to one end of the bridge conveyer unit 14 at 70 and by raising or lowering the traveler members the position of the attached end of the bridge conveyer unit can be changed as desired. It has already been pointed out that the conveyer chains 66, 66 are each provided at spaced intervals with conveyer flights or arms 68. These flights 68 pass between the radial arms 151 on the adjacent end of the bridge conveyer unit and when the latter and the ship conveyer unit 12 are operated in timed relation, the arms 151 serve to transfer units of cargo to or from the flights 68.

It will be noted, particularly by reference to Figure 1, that both the dock conveyer unit 10 and the ship conveyer unit 12 are provided at their lower ends with arcuate chutes 182 which serve to control the direction of movement of units of cargo moving to or from the conveyer units.

Figures 18, 19:
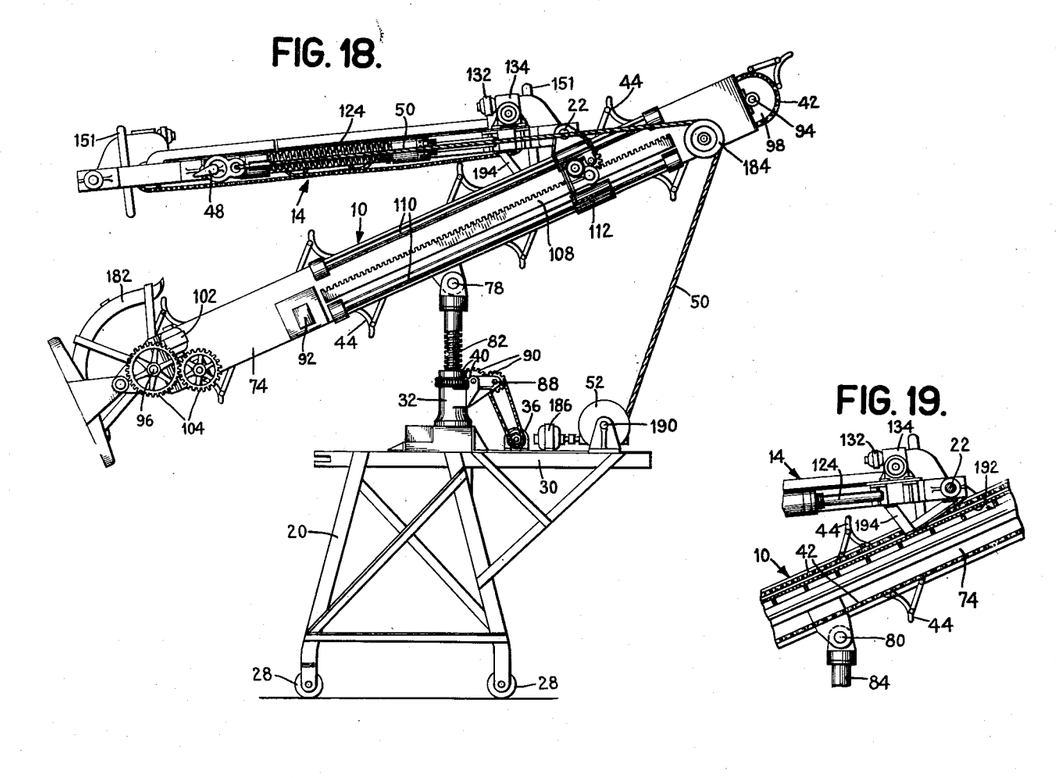
Figure 18 is a view in side elevation of the dock conveyer unit swung clear of the dock with the bridge conveyer unit in a collapsed position with respect to the dock conveyer unit.
Figure 19 is a detail section showing the means employed for supporting the collapsed bridge conveyer unit on the dock conveyer unit.

Having now described in some detail the construction and arrangement of the three principal structural units collectively making up the apparatus and having shown how they are assembled in cooperative relation during operation, it is now desired to describe the way in which the dock conveyer unit is arranged to permit its movement from place to place. After the bridge conveyer unit 14 has been disengaged from the ship conveyer unit 12, the traveler members 112, 112 are ordinarily raised as far as they will go on the shafts 110. This movement is, of course, accomplished by operating the electric motors 114,

114 which in turn operate the pinions 116, 116 on the racks 108, 108. When the traveler members 112, 112 have reached their upper-most point, the entire bridge conveyer unit 14 is lowered about the pivotal connection 22. This lowering of the unit is accomplished through the operation of the windlasses 52, 52 to which the cables 50, 50 are attached, the cables passing over pulleys 184, 184 which are rotatably mounted near the top of the side plates 74, 74. The windlasses 52, 52 are each operated by a reversible electric motor 186 through a gear reduction unit 188 which in turn provides rotation for a shaft 190 upon which the windlasses 52 are mounted. On the inside face of each of the plates 74 (see Figure 9) of the dock conveyer unit 10 there is mounted an elongated gusset member 192 which serves as a support for structural feet 194 mounted on the underside of the bridge conveyer unit 14. The two structural feet 194 which are on opposite sides of the unit 14 are intended to support the bridge conveyer unit when it is in a collapsed position as shown in Figure 18. By thus preventing the total collapse of the bridge conveyer unit with respect to the dock conveyer unit, the flights of both units are protected from possible damage. If, however, the flights are of a collapsible type or are removed, the bridge conveyer unit can be completely collapsed with respect to the dock conveyer unit as shown in Figure 20.

When, for any reason, it is necessary or desirable to swing the dock conveyer unit to any position other than the vertical, that can be accomplished by operating the jacks 32 and 34 to raise the entire unit clear of the dock floor after which the unit can be swung to the desired position around the pivotal connections 78, 78.

Figures 20, 21, 22:
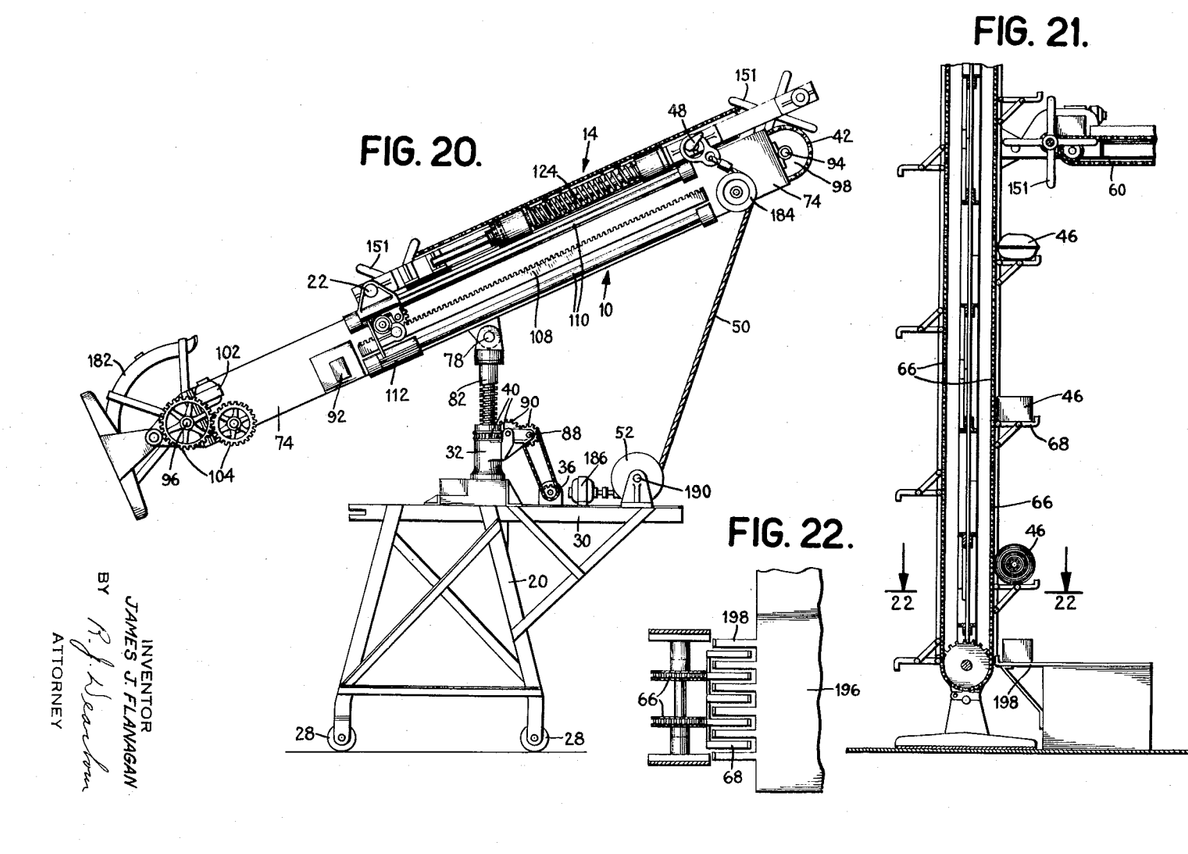
Figure 20 is a view in side elevation of the dock conveyer unit swung clear of the dock with the bridge conveyer unit collapsed in another position with respect to the dock conveyer unit.
Figure 21 is a view of a modified form of ship conveyer unit adapted to operate in conjunction with a stationary loading platform and capable of handling diversified types of cargo units.
Figure 22 is a view in horizontal section taken on line 22—22 of Figure 21.

Figure 21 illustrates a modified form of ship conveyer unit 12 with flights or arms 68 capable of holding different styles of packages or units of cargo 46. Furthermore, the unit is shown in position besides a loading platform 196 having a bifurcated forward extension 198 so arranged that the flight 68 can readily pass through the bifurcated sections while the conveyer 66 is in operation.

Operation of apparatus

From the foregoing it will be seen that with the apparatus just described, units of cargo of any character can be readily transferred from a dock to a ship or from a ship to a dock. Assuming that movement of such units of cargo is from a dock to a ship, the units 46 are fed to the chute 182 of the dock conveyer unit from which they are picked up in succession by the flights 44 on the conveyer chains 42. As the units of cargo reach the level of the bridge conveyer unit 14, they are engaged by one of the rotating radial arms 151 on the adjacent end of the bridge conveyer unit 14 and by reason of the rotating movement of the engaging arm, the unit of cargo is moved from the flight 44 to the conveyer chains 58 which move the unit of cargo horizontally until it is picked up by the second pair of conveyer chains 66. As the unit of cargo approaches the ship conveyer unit 12, it is engaged by one of the rotating radial arms 151 on the shaft 144, and by that arm, it is moved from the conveyer chains 60, 60 to one of the flights 68 attached to the conveyer chains 66, 66. The downward movement of the conveyer chains lowers the unit of cargo to the point where the flight 68 drops it into the chute 182 of the ship conveyer unit 12, and in this chute the unit gravitates to the hold of the ship or to the deck or other structure upon which the ship conveyer unit is mounted.

It will be apparent that the successful operation of the combined apparatus depends upon the synchronized operation of the several cooperating parts, and it is therefore essential that the operation of each separate unit be timed to correspond with the operation of each of the other units. While individual motors have been illustrated and described as being used to operate the several elements, it will be apparent that the apparatus is capable of operation from a single source of power. However, because of the size of a structure of this character and the weight of the loads to be carried, it is considered preferable to utilize separate sources of power for operating each of the separate but cooperating units, but when this procedure is followed, careful attention must be given to the proper timing of the various elements.

As previously stated, the apparatus is intended for transferring units of cargo in either direction, and when it is desired to unload a cargo from a ship to a dock, it is simply necessary to reverse the direction of movement of the apparatus by reversing the several motors so that units of cargo will be transferred from the ship conveyer unit 12, then to the bridge conveyer 14, and finally to the dock conveyer unit 10 which deposits the cargo units upon the dock or loading platform as shown in Figure 21.

Although a preferred embodiment of the invention has been set forth in connection with apparatus having a particular construction and arrangement of parts and mode of operation, it is obvious that various changes and modifications may be made therein, while securing to a greater or lesser extent some or all of the benefits of the invention, without departing from the spirit and scope thereof. Therefore only such limitations should be imposed as are indicated in the appended claims.

I claim:

1. Cargo conveying apparatus comprising a dock conveyer unit, a ship conveyer unit, and a bridge conveyer unit operatively connected at one end to the dock conveyer unit and capable of operative engagement at its opposite end with the ship conveyer unit, means for moving the bridge conveyer unit into a substantially horizontal position and operative engagement with the ship conveyer unit, endless conveyers on each of said units for moving units of cargo, radially extending arms rotatably mounted on the opposite ends of said bridge conveyer unit for transferring said units of cargo to and from the adjacent dock and ship conveyer units and means for rotating said radially extending arms in synchronism with the conveyers of the bridge conveyer unit.

2. Cargo conveying apparatus comprising vertically disposed dock and ship conveyer units each including an endless conveyer having spaced flights thereon for supporting units of cargo, a substantially horizontally disposed conveyer unit adapted to be pivotally connected at its opposite ends to the dock and ship conveyer units and including an endless conveyer, rotatably mounted spaced radial arms disposed at the opposite ends of the bridge conveyer unit and adapted to engage units of cargo on said conveyers and to transfer said units from the conveyer of one unit to the conveyer of an adjacent unit, and means for operating said conveyers and said radial arms.

3. In cargo conveying apparatus, a conveyer unit comprising a frame having spaced side plates, a pair of spaced shafts mounted on each of said side plates, a stationary rack mounted on each of said side plates co-extensive with each pair of said shafts, a traveler member slidably mounted on each pair of shafts, a pinion operatively connected with each of said traveler members and adapted to engage one of the said racks, and means for operating said pinions in either direction to thereby raise and lower the traveler members.

4. In cargo conveying apparatus, a dock conveyer unit having vertically disposed spaced side plates, a pair of spaced vertically disposed shafts mounted on each of said side plates, a traveler member mounted on each pair of said shafts, means for moving said traveler members on said shafts, a bridge conveyer unit pivotally connected at one end to said traveler members, and means for swinging the bridge conveyer unit about the pivotal connection to any desired position.

5. Cargo conveying apparatus comprising dock and ship conveyer units each having vertically disposed spaced side plates, pairs of spaced vertically disposed shafts mounted on each of said side plates of the dock and ship conveyer units, a traveler member mounted on each pair of said shafts, means for separately moving said traveler members on said shafts, and a bridge conveyer unit adapted to span the space between the dock and ship conveyers and to be pivotally connected at its opposite ends to the traveler members of the dock and ship conveyer units whereby any movement of the traveler members is imparted to the bridge conveyer unit.

6. Cargo conveying apparatus comprising a dock conveyer unit, a ship conveyer unit, and a bridge conveyer unit adapted to span the space between the dock and ship conveyer units, vertically movable traveler members mounted on the dock and ship conveyer units, means for pivotally connecting the opposite ends of the bridge conveyer unit to the traveler members of the dock and ship conveyer units, and means for actuating said traveler members to separately move the ends of the bridge conveyer unit into operating positions.

JAS. J. FLANAGAN.